Patented Dec. 4, 1951

2,577,521

UNITED STATES PATENT OFFICE 2,577,521

CASHEW NUT SHELL EXTRACT

Mortimer T. Harvey, South Orange, N. J., assignor to The Harvel Corporation, a corporation of New Jersey No Drawing. Application February 27, 1948, Serial No. 11,843

3 Claims. (Cl. 260—210)

This invention relates to novel methods for treating cashew nuts and more particularly to certain components thereof and to products obtained thereby.

The whole cashew nut consists of an edible kernel and an outer shell containing a quantity of a liquid known as cashew nut shell liquid. The outer shell consists of a kidney shaped housing comprised of an inner fibrous envelope and an outer fibrous envelope between which is a honeycomb fibrous structure loaded with the cashew nut shell liquid. Ordinarily the whole nuts are collected and then passed through a cashew nut shell liquid bath maintained at about 400° F.–500° F. By maintaining said whole nuts in said bath for a period of 1 to 5 minutes, an amount of the cashew nut shell liquid equal to 10–13% of the weight of the raw whole nuts seeps out of the shells thereof and into the bath. These partially cashew nut shell liquid-depleted nuts which are now coated with cashew nut shell liquid on the outer surface thereof may be centrifuged to separate this coating therefrom and to provide comparatively dry nuts which may be cracked manually or by centrifuging against an impact surface whereby the kernals are separated from the shells and then in any desired manner, the kernels are placed in one container and the partially spent shell fragments in another. These partially spent shell fragments are of various sizes and shapes and the major part by weight have a dimension of at least ⅛ of an inch. These shell fragments consist of a tough fibrous material in combination with residual cashew nut shell liquid which may be present by weight in amounts up to about 25% of the weight of the shell fragments. Usually, however, the cashew nut shell liquid present in the shell fragments is in the range of 18%–22% of the weight of the shell fragments. Heretofore these shell fragments have in greater part been used as fuel in those plants where the cashew nut shell liquid is recovered from the whole cashew nuts.

In the course of my experimentations with cashew nuts, I have discovered that these shell fragments may be treated or processed in various ways to provide highly useful products, which may serve in a variety of different fields and particularly in the fields of food products, cathartics, tanning leather, writing and printing inks, in carbonated beverages for laying down and controlling the sweetening effect, in the preparation of other chemicals, such as furfuraldehyde and the like, and in the production of resins by reacting them with aldehyde and/or cashew nut shell liquid to provide resinous products.

According to this invention the partially spent shell fragments may first be placed in a pressure unit, such as a hydraulic press or an Anderson Expeller and hot pressed at temperatures of 175° F.–250° F. whereby a portion of the cashew nut shell liquid in the shell fragments is squeezed out and recovered, leaving behind a cake whose cashew nut shell liquid content is no greater than 15% of the weight of the cake and may be as low as about 2% of the weight of the cake depending upon the pressure employed and the period of time of pressure application.

Still another method which may be employed is to break open the whole nuts while at normal temperatures or in the cold, remove the kernels, and the shell fragments are then thrown into a container in which is caught any of the cashew nut shell liquid therein which has separated from the shells, dumped into a pressure unit, such as an hydraulic press and hot pressed at 175° F.–250° F. whereby most of the cashew nut shell liquid is squeezed out and recovered leaving behind the resultant cake containing 2%–15% by weight of cashew nut shell liquid.

If desired, the shells obtained either after the hot extraction or in cold breaking may be treated with a solvent for the cashew nut shell liquid to remove substantially all of the cashew nut shell liquid therefrom. Then the solvent adhering to the shell is evaporated off.

Either of the aforementioned cakes or the fragmentary shells obtained after the hot extraction or cold breaking may be heated to partially or substantially completely decarboxylate the residual cashew nut shell liquid. If desired the decarboxylation may be effected before pressing.

These various cakes as well as the shell fragments obtained after the hot extraction or cold breaking and subsequent pressing and containing 2%–25% by weight of cashew nut shell liquid are preferably comminuted by means of a hammer mill to provide a mass of substantially discrete particles at least 95% of which by weight passes a 10-mesh screen. The comminuted mass consists of small particles of shells coated and/or impregnated with the residual cashew nut shell liquid and this mass will hereinafter be known as product A.

Product A may be heated at about 100° C.–110° C. either at atmospheric or subatmospheric pressure to substantially completely dehydrate the mass. Then this dehydrated mass is mixed with a quantity of an organic solvent for the cashew nut shell liquid, such as benzol, toluene, ethyl alcohol, petroleum solvents, etc., in excess of the quantity necessary to dissolve all of the cashew nut shell liquid in the mass. This mixture may be agitated and heated to a temperature just below that of the boiling point of the solvent. Then the mass may be filtered and the solids collected may again be treated with the hot solvent for the cashew nut shell liquid. This mixture is filtered and the filtrate recovered is combined with the first filtrate. The combined filtrates may be distilled under reduced pressure to distill off the solvent from the cashew nut shell liquid. The recovered solids consist of the cashew nut shells substantially dry and free of cashew nut shell liquid. These dry cashew nut shell liquid-free shell particles, as well as those recovered by solvent extraction and no pressing but with subsequent comminution are first heated for at least ten minutes and preferably 10–120 minutes at a temperature between 175° F. and the temperature about 10° F.–20° F. below the charring temperature thereof. The resultant heat processed cashew nut shell liquid-free shell particles are now mixed with water and this mixture may be subjected to boiling under a reflux condenser for 1–2 hours. In all cases, I prefer that the shell particles be in finely comminuted state when so treated with water. The mix is then allowed to cool, or may be filtered hot, the filtrate is caught and the residue is further treated. The filtrate contains solids in water solution and the ratio of the total weight of said solids therein to the weight of said residue is approximately 2 to 5. Said solids may be recovered from said filtrate by evaporating said filtrate to dryness. The percent of water soluble solids in said filtrate based on the weight of the substantially dry oil-free shells is in the range of 20 to 33. The residue may then be subjected to hydrolysis (employing the Williams-Olmsted technique, J. Biol. Chem., 108 (1935) pp. 653–66). The solids in solution are hydrolyzed (W.-O. technique) and then there are recovered from this hydrolyzed filtrate: hexoses, pentoses, total astringency (non-tannin astringency and tannins), and the solids recovered from the hydrolyzed residue are: hexoses, pentoses (or pentosans and furfuraldehyde) and lignin.

The following example is a specific method of the invention and is given merely in an illustrative and not in a limiting sense.

100 parts of product A is maintained at about 105° C. until substantially completely dehydrated. The resultant substantially moisture-free material was treated with hot benzol whereupon all of the cashew nut shell liquid therein was dissolved and separated from the shell fragments. Then these fragments substantially free of cashew nut shell liquid and having been dried were mixed with water and this mixture was boiled under a reflux condenser for 2 hours. The mixture was filtered and the filtrate and residue recovered. The filtrate was evaporated to dryness and the ratio by weight of said dry material recovered from said evaporation to said residue is in the ratio of approximately 20 to 50. This filtrate containing 21.8 parts of solids in solution may be subjected to hydrolysis and then there are recovered therefrom the following products by weight:

|   | Parts |   |
|---|---|---|
| Hexoses | 4.5 |   |
| Pentoses | 8.5 |   |
| Non-tannin astringency | 3.4 | total astringency |
| Tannins | 1.2 | 4.6 parts |
| Products of hydration and mineral matter | 4.2 |   |

The residue measuring 49.8 parts by weight was subjected to hydrolysis employing the W.-O. technique and from said hydrolyzed residue were recovered the following products by weight:

|   | Parts |
|---|---|
| Hexoses | 13.4 |
| Lignin | 12.4 |
| Pentoses | [1] 11.2 |
| Products of hydration and mineral matter | 12.8 |

[1] May be converted to 9.9 parts pentosans or 3.3 parts furfural.

This product recovered from the hydrolysis of the residue swells in water and finds an especial use as a cathartic, food and therapeutic product.

If desired the entire oil-free shells may be directly subjected to hydrolysis, employing an acid such as sulphuric. After the hydrolysis the mass is neutralized and filtered. The filtrate may be partially or completely dehydrated. The water soluble solids therein are hexoses, pentoses, astringency products, lignins. The lignins may be separated therefrom. The quantity by weight of said water soluble solids measure at least 25% and generally 50%–90% of the weight of the substantially oil-free, substantially dry cashew nut shells.

If desired, the cashew nut shell liquid-laden shell fragments, of the cold or hot extracted type and after subsequent pressing and containing 2%–15% cashew nut shell liquid may be comminuted or ground to the sizes hereinbefore defined and then such comminuted products may be mixed with water. This mixture is then heated to 150° F.–212° F. and maintained at this temperature 2 to 24 hours with or without the presence of a hydrolyzing agent, such as sulphuric acid or other mineral acids. If desired this step may be conducted at superatmospheric pressure up to 100 lbs. p. s. i. The resultant mass is neutralized and filtered to remove any solids. The filtrate contains water soluble components and some cashew nut shell liquid therein. The filtrate may be shaken with a cashew nut shell liquid solvent, such as benzol, naphtha, etc., whereby the cashew nut shell liquid compound is dissolved and may be separated and removed from the remainder of the filtrate.

Having thus described my invention, what I claim is:

1. The method comprising heating cashew nut shells, comminuting said shells, then while in the comminuted state and substantially free of cashew nut shell liquid boiling a mixture thereof and water and separating the aqueous solution of extract from the solids, said extract containing a quantity of solids in solution measuring 20%–33% by weight of said shells in the substantially oil-free and moisture-free condition.

2. The method comprising heating cashew nut shells, comminuting said shells, then while in the comminuted state and substantially free of cashew nut shell liquid boiling a mixture thereof and water and separating the aqueous solution of extract from the solids, and hydrolyzing said solids.

3. The method comprising comminuting cashew nut shells which have been previously heated and containing up to 15% by weight of cashew nut shell liquid, then boiling a mixture thereof and water, removing the solids from the liquid phase, treating the liquid phase with an organic solvent for cashew nut shell liquid and separating cashew nut shell liquid-organic solvent solution therefrom leaving behind an extract containing a quantity of solids in solution measuring 20%–33% by weight of said shells in the substantially oil-free and moisture-free condition.

MORTIMER T. HARVEY.

REFERENCES CITED

The following references are of record in the file of this patent:

UNITED STATES PATENTS

| Number | Name | Date |
|---|---|---|
| 2,447,432 | Schaufelberger | Aug. 17, 1948 |